United States Patent [19]

Johnson

[11] 3,774,021

[45] Nov. 20, 1973

[54] LIGHT EMITTING DEVICE

[75] Inventor: Bertrand Harold Johnson, Murray Hill, N.J.

[73] Assignee: Bell Telephone Laboratories Incorporated, Murray Hill, N.J.

[22] Filed: May 25, 1972

[21] Appl. No.: 256,800

[52] U.S. Cl. ............... 240/2.1, 240/1 EL, 240/2.17, 240/8.16, 313/108 D

[51] Int. Cl. ........................................ G01d 11/28

[58] Field of Search .................. 240/1 EL, 2.1, 2.17, 240/41.1, 8.16; 313/108 D, 113

[56] References Cited

UNITED STATES PATENTS

| | | | |
|---|---|---|---|
| 3,676,668 | 7/1972 | Collins et al. | 240/8.16 X |
| 2,538,475 | 1/1951 | Skrastin, Jr. | 240/1 EL X |
| 2,835,789 | 5/1958 | Roper | 339/125 L X |
| 2,724,766 | 11/1955 | Hawley et al. | 240/1 EL |
| 3,596,136 | 7/1971 | Fischer | 313/108 D X |
| 3,450,870 | 6/1969 | Curl | 240/8.16 |
| 3,638,009 | 1/1972 | Strianese | 240/8.16 X |

*Primary Examiner*—Richard M. Sheer
*Attorney*—W. L. Keefauver et al.

[57] ABSTRACT

A light emitting diode module with a dome encapsulant in which the geometry is designed to maximize the light output in the plane of the junction. The module is adapted to couple light into a planar light guide, such as a telephone dial faceplate, so that discrete remote regions of the faceplate can be illuminated. The objective generally is to illuminate several such regions with a lesser number of light emitting elements.

7 Claims, 7 Drawing Figures

LIGHT EMITTING DEVICE

There is currently a good deal of interest in illuminating dials and the like with so-called solid-state light emitting elements. In many cases, it is only essential to illuminate discrete regions of a relatively large area. If there are several such regions, too many to include a separate light emitting device in each, it is desirable to have a convenient way of coupling light from one, or a few, light emitting devices to several such regions.

A specific application with this requirement is the illumination of pushbuttons in telephone dials. Typically, there are 12 buttons, spaced apart in a 3 × 4 matrix. Telephone line powering of the illuminating means is compatible with the use of only a few light emitting diodes. An efficient means of coupling the light from one or a few diodes to all 12 buttons is the specific objective of this invention. In its broader aspects, it proposes a means for coupling light between a number of discrete regions in a dial display or the like and a lesser number of light emitting devices.

The coupling means is an essentially planar light guide that intersects the regions to be illuminated. The light emitting devices are designed according to principles of internal reflection so that the predominant portion of the light produced in each diode is emitted in a confined plane and with a uniform flux over 360°. The light can thereby be coupled efficiently into the light guide.

These and other aspects of the invention will become more apparent from the following detailed description.

Figure 1:
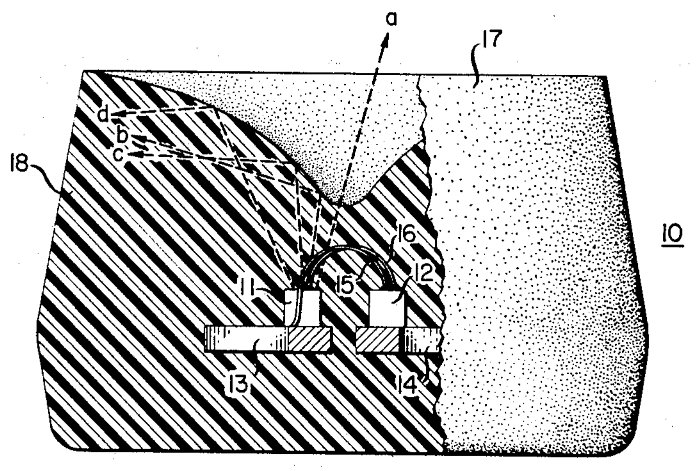
FIG. 1 is a front-sectional view of a light emitting device module combining the usual diode chip with an encapsulating dome that directs a predominant portion of the light emitted from the diode into the horizontal plane normal to the section.

Referring first to FIG. 1, the light emitting module 10 includes the usual type of light emitting device. In this particular device, there are two light emitting diodes 11 and 12, so that at least one diode will be illuminated regardless of the polarity of the D.C. bias. This feature is a consequence of the particular system that powers the light emitting elements and is in no way essential to the invention. Two diodes connected back-to-back may also find use with A.C. power. The diodes 11 and 12 are mounted on a lead frame that comprises tabs 13 and 14. The tabs can be connected to an appropriate power source for activating the light emitting devices. The bonded surface of the diodes forms one electrical connection with the other provided by bonded wires 15 and 16.

The dome encapsulant 17 is molded around the lead frame and the diodes in a conventional manner. The encapsulant can be any of several optically transparent materials, such as a silicone, epoxy or acrylic resin. The shape of the dome is an important feature of the invention. The sidewall 18 can be cylindrical or conically shaped but in either case shaped so that all light emanating from the diodes that is incident on the wall on the first pass intersects at an angle less than the critical angle and thus escapes the sidewall. While it is evident that light leaving the dome through this surface will have a large angular spread, this is acceptable within certain boundaries as will be seen when the dome is coupled to the light guide. It is pertinent to note that the angular spread is a function of the height of this sidewall and the distance separating the sidewall from the light emitting device. A decrease in the former or an increase in the latter will produce a narrower angular spread in the first pass output beam through the sidewall, but will result in greater losses through the ceiling of the dome. The invention is largely aimed at reducing the latter, although it is evident that various tradeoffs occur. For the purpose of defining the invention, it is sufficient at this point to require that all first pass rays emanating from the light emitting devices and incident on the sidewall meet the sidewall at an angle less than the critical angle.

The refraction and reflection of first pass rays incident on the ceiling of the dome is somewhat more complex. The objective of this dome design is to minimize loss of light through this surface. Light reflected from this surface has a high probability of exiting the dome through the sidewall 18, the ultimate goal.

The behavior of light rays incident on the ceiling of the dome can be analyzed readily if the shape of the ceiling is assumed to be an inverted cone. The deviation from the conical shape that is evident in the dome shown in FIG. 1 results from various fabrication considerations, most notably, the susceptability of sharp edges or points in plastic casting dies to wear, and the consequences in molded bodies of the presence of acute local strains induced by geometrical extremes. In a simple ray optics analysis, there are two relevant variables in this structure — the distance of the apex of the inverted cone from the light emitting surface, and the slope or conicity of the conical surface. Given a height and position of the sidewall 18 with respect to the light emitting surface, only one of the parameters is variable. The height of the sidewall corresponds, as will be seen, to the thickness of the faceplate, and, therefore, is a likely parameter to be fixed by non-optical design criteria. However, we have already noted that a maximum height exists for the sidewall to allow exit for all rays incident on the first pass. With this as a starting point, consider the simple model shown in FIG. 3A. The sidewall 18 is assigned dimension $y$ and the distance separating the base of the sidewall and the light emitting device 11 is $x$. The angle $\Theta_2$ of the sidewall is picked to be 90°, a convenient end point. (The sidewall can assume a negative slope with an analysis similar to the following. However, no advantage is seen in that structure.) The angle $\Theta_1$ is the maximum angle of incidence from a first pass ray $r_1$. The limiting condition for this case is simply:

$$\Theta_1 > 90° - \phi = tan^{-1}(x/y)$$

where $\phi$ is the critical angle.

It is quickly evident that $y$ can exceed the length shown as $\Theta_2$ decreases. The limiting case is that in which $\Theta_2 = 90° - \phi$. By symmetry, the limiting case is that in which the sidewall is normal to the ray $r$. The important fact is that, as the sidewall is sloped and more of the output (in an angular sense) of the light emitting element exits through the sidewall, more of it also exits in directions approaching normal to the plane of the light guide and this is contrary to our assigned goal.

At this point, it is helpful to consider the slope of the sidewall with reference to the light guide. An exemplary combination is schematically shown in FIG. 3B. The relevant portion of the light guide is indicated by 20 and comprises a part of an essentially planar sheet of plastic (from the standpoint of optics, the guide will tolerate considerable curvature) or other appropriate transparent material with a beveled edge 21 adapted to mate approximately with sidewall 18. The interface between these elements will result in some optical loss depending upon the care in matching the geometry of these surfaces.

Referring to FIG. 3B and assuming that the critical angle = $\Theta_2$, a series of light rays subtended by the arc designated $\Theta_L$ will be lost through the surface of the light guide 20 because they are incident along the region of 20 indicated by the dimension "L." This is a geometric consequence of the slope of the sidewall 18. (The dimension $x$ remains fixed.) There are at least three ways of overcoming this loss. An obvious one is to reduce the thickness dimension $y$ so that the top edge, where the light guide and the dome intersect, occurs at the point of incidence of ray $r_2$. However, the thickness dimension may be inflexible in which case the geometry may be adjusted as in FIG. 3C. Now the problem rays are incident on the dome of the structure and can be coupled into the guide 20 as shown. It is evident that a third alternative lies in adjusting the dimension $x$ to achieve a similar result. Indeed, the three parameters just discussed can be varied within reasonable limits to obtain the desired result. That result is most easily expressed as ensuring that all rays, emanating from the light emitting element, strike the top edge of the light guide, where it interfaces with the internally reflecting dome of the light emitting element, at an angle greater than the critical angle and are thereby reflected on the first pass. Any rays that are reflected on the first pass within the light guide have a high degree of probability of being coupled into the region in which illumination is desired.

Figure 2:
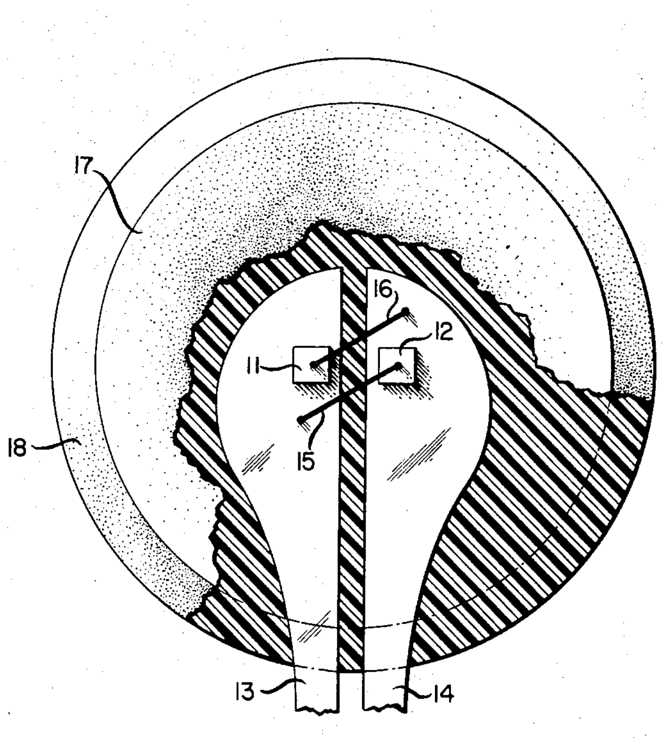
FIG. 2 is a plan view of the module of FIG. 1.
Figure 3A:
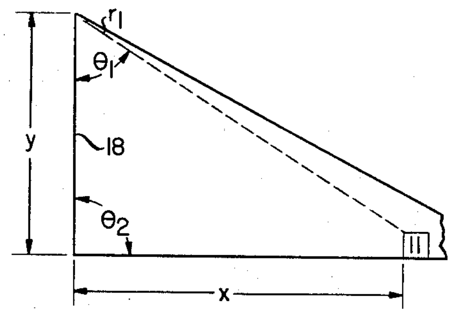
FIGS. 3A, 3B and 3C are schematic diagrams showing by simple ray optics the behavior of light in the device of the invention.
Figure 3B:
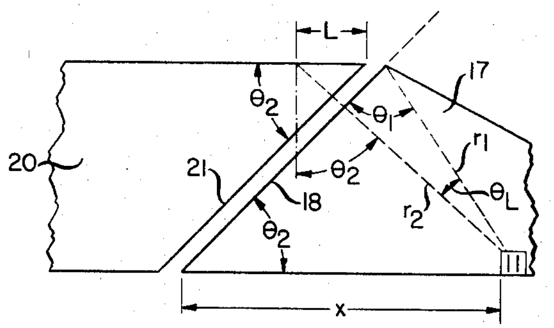
Figure 3C:
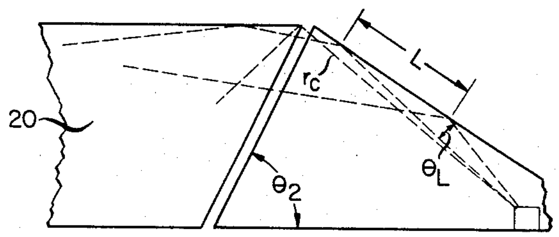
Figure 4:
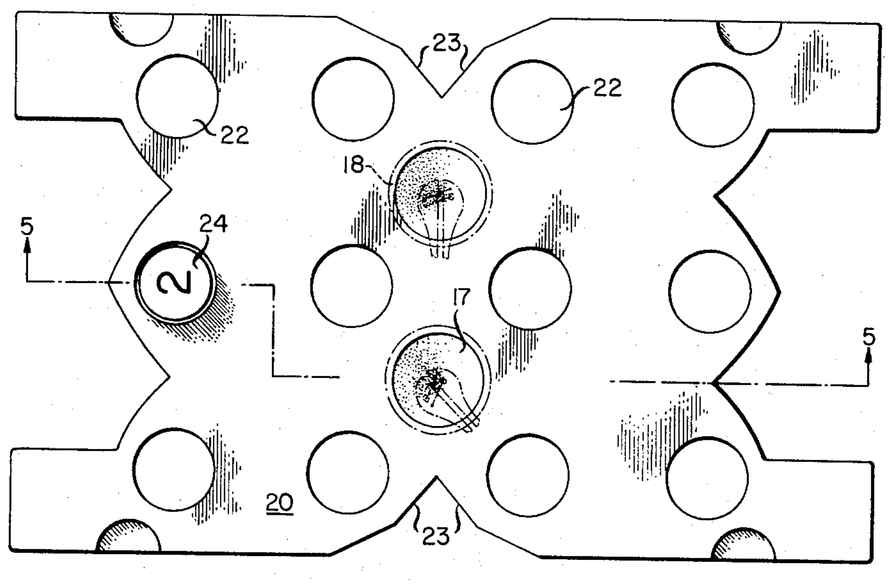
FIG. 4 is a plan view of the planar light guide which, for the particular application illustrated, is a faceplate for a pushbutton telephone dial.
Figure 5:
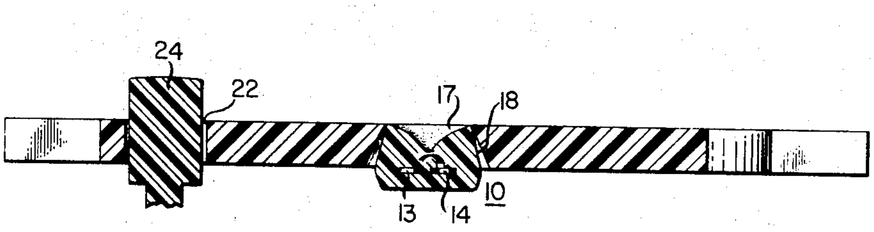
FIG. 5 is a front section through 5—5 of FIG. 4 showing the interface coupling the light from the light emitting device into the light guide and from the light guide into a pushbutton to be illuminated.

The light guide, which in the preferred application serves as the faceplate of a pushbutton dial, is shown in plan view in FIG. 4, with the section 5—5 shown in FIG. 5. This faceplate has 12 holes 22 to accommodate the pushbuttons. The side edges of the faceplate are provided with re-entrant portions 23 so that light rays incident along this edge will be reflected and retained within the guide. It will be appreciated that, if the material of the faceplate has a normal index of refraction characteristic of transparent plastic materials, i.e., $>>1$, then virtually every ray incident on a major surface of the light guide will be internally reflected. Efficient coupling of the light into the guide from the light emitting elements 17 was discussed in connection with FIGS. 2 and 3. Coupling of the light from the guide into the regions to be illuminated depends on the objective. For example, the regions indicated at 22 could consist of inserts of a material with high-light scattering. These could be regions of the plastic faceplate roughened by chemical etching or mechanical abrasion. Either of these alternatives would be appropriate, for instance, if the buttons are electrically active through capacitive coupling. In the specific structure shown, the faceplate is provided with holes 22 that accommodate pushbuttons, only one of which is shown at 24. The pushbuttons are constructed of translucent plastic, which collect the light from the waveguide and, through dispersion of the light within the translucent plastic, effectively illuminate numerals formed on the surface of the buttons. The numerals indicate telephone dial numbers.

The arrangement of the light emitting elements with respect to the 12 regions to be illuminated is particularly effective. The light emitting elements are located approximately at the center of the two squares formed by interconnecting the nearest neighbors in the middle two rows of the 3 × 4 matrix. Light emitted from the elements 17 will either be internally reflected from the edge of the guide or will be incident on one of the pushbuttons 24 on the first pass. It is evident that each of the openings 22 will be exposed to substantial light.

It will be evident from FIG. 3A that the light emitting module and the opening in the faceplate into which it extends can be cylindrical rather than conical.

It is significant to recognize that light can be coupled readily between discrete regions, such as those described, by using reflective coatings. However, the structure described here achieves equivalent results without the expense of such coatings.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. An illuminated faceplate in which a number of discrete regions of the faceplate are illuminated with light from a lesser number of light emitting elements comprising:

a substantially planar sheet of transparent plastic having a plurality of spaced-apart regions to be illuminated, the sheet having at least one approximately circular opening through its thickness, at least one light emitting device fitted within each opening of the sheet, each light emitting device comprising:

at least one light emitting diode, electrical leads for contacting the diode, a transparent plastic dome encapsulating the diode and a portion of the electrical leads while leaving a portion of the electrical leads exposed, the plastic dome having a peripheral geometry corresponding approximately to that of the opening in the sheet, and when inserted within the opening having a top surface exposed through the opening in the surface of the sheet, the top surface having a depression therein extending toward the light emitting diode to form an approximately conically shaped, internally reflecting surface with respect to the light emitting diode, the conically shaped surface having an apex angle such that all of the light incident on the dome except that essentially at the apex will be internally reflected and coupled into the sheet and the periphery of the plastic dome having a geometry with respect to the light emitting diode such that substantially all the light incident on the periphery is coupled into the sheet.

2. The faceplate of claim 1 in which the transparent plastic dome encapsulating the diode has a cylindrical shape with the depression formed into the top surface.

3. The faceplate of claim 1 in which the transparent plastic dome encapsulating the diode has the shape of a truncated cone with the depression formed into the top surface.

4. The faceplate of claim 1 in which the discrete regions of the faceplate to be illuminated comprise holes in the faceplate with pushbuttons extending through the holes.

5. The faceplate of claim 4 including two light emitting elements.

6. The faceplate of claim 5 having 12 holes arranged in a 3 × 4 matrix with the two light emitting elements coupled to the sheet approximately at the center of the two squares formed by connecting nearest neighbors of the two middle rows of three holes in the matrix.

7. The illuminated faceplate of claim 1 in which the edges of the sheet are provided with re-entrant portions that internally reflect light incident on these portions and reduce light loss.

* * * * *